United States Patent
Ding (10) Patent No.: US 6,229,285 B1
(45) Date of Patent: May 8, 2001

(54) DETECTOR FOR RAPID CHARGING AND METHOD

(75) Inventor: Yi Ding, Canton, MI (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/543,275

(22) Filed: Apr. 5, 2000

Related U.S. Application Data (63) Continuation-in-part of application No. 09/165,944, filed on Oct. 2, 1998, now abandoned.
(60) Provisional application No. 60/061,088, filed on Oct. 3, 1997, and provisional application No. 60/088,897, filed on Jun. 11, 1998.

(51) Int. Cl.[7] ............................... H02J 7/00; H01M 7/44
(52) U.S. Cl. ......................... 320/132; 320/139; 324/427
(58) Field of Search ................................... 320/132, 139; 324/427, 432, 433

(56) References Cited

U.S. PATENT DOCUMENTS

| | | | |
|---|---|---|---|
| 3,597,673 | * 8/1971 | Burkett et al. | 320/129 |
| 3,609,503 | * 9/1971 | Burkett et al. | 320/129 |
| 3,614,582 | * 10/1971 | Burkett et al. | 320/129 |
| 3,614,583 | * 10/1971 | Burkett et al. | 320/129 |
| 3,622,857 | * 11/1971 | Sethi | 320/130 |
| 3,816,806 | * 6/1974 | Mas | 320/129 |
| 4,829,225 | * 5/1989 | Podrazhansky et al. | 320/129 |
| 5,099,186 | 3/1992 | Rippel et al. | 318/803 |
| 5,119,011 | 6/1992 | Lambert | 320/43 |
| 5,233,284 | * 8/1993 | Mattsson | 320/133 |
| 5,307,000 | * 4/1994 | Podrazhansky et al. | 320/129 |
| 5,341,075 | 8/1994 | Cocconi | 318/139 |
| 5,432,420 | 7/1995 | Bahn | 318/701 |
| 5,433,512 | 7/1995 | Aoki et al. | 303/3 |
| 5,476,310 | 12/1995 | Ohtsu et al. | 303/3 |
| 5,481,174 | * 1/1996 | Martin et al. | 320/129 |
| 5,500,583 | * 3/1996 | Buckley et al. | 320/129 |
| 5,552,681 | 9/1996 | Suzuki et al. | 318/139 |
| 5,583,406 | 12/1996 | Mutoh et al. | 318/376 |
| 5,608,308 | 3/1997 | Kiuchi et al. | 322/11 |
| 5,625,274 | * 4/1997 | Naskali | 320/149 |
| 5,670,861 | 9/1997 | Nor | 320/15 |
| 5,680,031 | * 10/1997 | Pavlovic et al. | 320/145 |
| 5,684,383 | 11/1997 | Tsuji et al. | 320/5 |
| 5,694,023 | * 12/1997 | Podrazhansky et al. | 320/129 |
| 5,707,115 | 1/1998 | Bodie et al. | 303/3 |
| 5,710,699 | 1/1998 | King et al. | 363/132 |
| 5,712,549 | 1/1998 | Engel | 318/376 |
| 5,726,554 | * 3/1998 | Freiman et al. | 320/157 |
| 5,736,834 | * 4/1998 | Kuno | 320/146 |
| 5,831,435 | * 11/1998 | Troy | 324/426 |
| 5,905,364 | 5/1999 | Ookita | 320/141 |
| 5,914,605 | * 6/1999 | Bertness | 324/430 |

* cited by examiner

*Primary Examiner*—Peter S. Wong
*Assistant Examiner*—Gregory J Toatley, Jr.
(74) *Attorney, Agent, or Firm*—Thomas, Kayden, Horstemeyer & Risley LLP (57) ABSTRACT

Detectors and methods for rapid charging each provide efficient recharging of batteries of various types and ratings. During the charging process, the detector preferably monitors battery state of charge (SOC) and/or battery charge acceptance (BCA) in order to select appropriate waveforms for the charging signal. The charging signal may be a pulse width and amplitude modulated current, voltage or power waveform with the amplitude and pulse width of each charging pulse being selected based upon the detected battery SOC and/or BCA.

14 Claims, 13 Drawing Sheets

DETECTOR FOR RAPID CHARGING AND METHOD

This application is a Continuation-In-Part application which is based on and claims priority to U.S. patent application Ser. No. 09/165,944, filed on Oct. 2, 1998 now abandoned, which is based on and claims priority to U.S. Provisional Applications Ser. No. 60/061,088 and 60/088,897, filed on Oct. 3, 1997 and Jun. 11, 1998, respectively, which are all herein incorporated by reference.

BACKGROUND OF THE INVENTION

1. Field of the Invention

The present invention relates to batteries and, in particular, to battery charging devices and methods that include determining the battery charge acceptance and/or state of charge of a battery, and then efficiently charging the battery based on the battery charge acceptance and/or state of charge determination.

2. Description of Related Art

Devices and methods for charging and recharging various types and sizes of batteries, such as Ni/Cd batteries, lead-acid batteries, etc., are well known in the prior art. The conventional charging methods include, for example: constant current charging, constant voltage charging, and combinations of constant current and voltage charging, among others. These methods, however, have inherent shortcomings, such as causing excessive gas production (i.e. in lead acid and Ni based batteries), excessive heat production, electrolyte decomposition (i.e. in lithium ion batteries), and overcharging (particularly when utilizing a high charging current or voltage). These prior art charging methods also yield low coulombic efficiency and low energy efficiency which results in decreased service life of a battery and potentially higher charging costs.

Another prior art method for charging a battery is trickle charging. This charging method includes charging a battery with a low power charge over a long charging period and typically does not require the use of protective devices, such as over-charging or over-temperature protection circuitry, in order to protect the battery being charged from damage that can result from improper charging. Trickle charging, however, has met with some disfavor as the need for faster charging methods have become more prevalent. For example, many devices, such as electric vehicles, portable tools, etc, have become common place and consumer demand has dictated that these items be readily available for use at a moment's notice, thereby necessitating the use of fast-charge methodologies for charging and recharging the batteries which power these devices.

Prior art fast-charge methods typically utilize relatively large charge current levels in order to charge batteries within a relatively short period of time. Large current levels, however, can cause rapid heating of a battery, and can otherwise result in low charging efficiency as well as a reduction of battery service life.

U.S. Pat. Nos. 5,680,031 and 5,179,335 disclose methods of charging a battery by controlling charging power based upon the battery's resistance-free voltage (see also, K. Kordesch et al., "Sine Wave Pulse Current Tester for Batteries," J. Electrochem Soc. Vol. 107, 480–83 (1960). As is well known, the resistance-free voltage of a battery is an effective measure of the electrochemical potential of the battery without regard to the internal resistance of the battery. The principle of the charging mechanisms disclosed in the aforementioned patents is to provide a battery with a constant charging current until the resistance-free voltage of the battery increases to a first predetermined level. Once the resistance-free voltage reaches the predetermined level, the charging current is reduced to a lower constant charging current and the resistance-free voltage in the battery is then allowed to rise to a second predetermined level. This process is repeated until the battery is charged to a desired resistance-free voltage. Although these methods provide a means for determining a battery's internal condition and for charging the battery in accordance with the measured internal conditions of the battery, these methods have not addressed the need to improve charging efficiency by increasing battery charge acceptance.

For various batteries, charge acceptance typically is high when battery state of charge (SOC) is low. As the SOC increases during battery charging, charge acceptance gradually decreases with charge acceptance typically decreasing sharply when SOC reaches approximately 50% of maximum SOC, and decreasing sharply once again when SOC reaches over approximately 85%. Therefore, when utilizing a conventional charging method, battery charging efficiency typically is low when the battery's SOC is low, with the charging efficiency increasing sharply to a relatively high value until SOC reaches over approximately 85%. As charging continues beyond approximately 85%, charging efficiency typically decreases sharply. This low charging efficiency is caused by excessive gas and heat production which can also result in decreased service life of a battery.

Additionally, U.S. Pat. No. 5,307,000 and 4,829,225 disclose methods of battery charging which utilize one or more high, positive current pulses and which include applying one or more negative current or depolarization pulses to the battery for short durations between successive positive current pulses. However, these methods do not address the problems associated with a changing battery SOC.

Due to charge current step-down protocol, which is well known in the prior art, excessive battery heating and overvoltage conditions may occur when charging a battery.

Therefore, there is a need to provide improved devices and methods for charging batteries which include determining a battery's SOC and/or BCA during the charging process and which adjust their charging algorithms accordingly.

SUMMARY OF THE INVENTION

The present invention relates to devices and methods for charging a battery and includes determining the state of charge (SOC) and/or battery charge acceptance (BCA) of the battery, and then charging the battery in a manner which is responsive to the determined SOC/BCA in an iterative process. This is accomplished in a preferred embodiment by applying an alternating current (a-c) pulse to a battery before initiating a charging sequence and recording the battery's response to the a-c pulse. The recorded impedance response, which can include series and parallel equivalent circuit parameters, i.e. resistance, capacitance and phase angle, among others, are then processed with battery condition information, such as temperature and internal pressure, in order to calculate the SOC of the battery. The battery's SOC can then be displayed in a conventional manner, i.e. on a monitor, gauge, etc, thereby providing an updated SOC reference or fuel gauge for the battery user.

Electro-chemical overvoltage also can be derived from application of a single current or voltage test pulse to a battery before initiating the charge pulse. Recording the battery response to the test pulse will enable SOC to be determined by correlation, voltage, current, and resistance free voltage, among others. The recorded response, which can include voltage, current, and electrochemical overvoltage, among others, are then processed with battery condition information, such as temperature and internal pressure, in order to calculate the SOC of the battery. The battery's SOC can then be displayed in a conventional manner, i.e. on a monitor, gauge, etc, thereby providing an updated SOC reference or fuel gauge for the battery user.

Following SOC determination, a charging sequence is initiated which includes applying a series of charging pulses to the battery. In a fast charging mode, a delay or rest period is provided between each charging pulse in order to stimulate battery charge acceptance. Charging pulses also can be applied to the battery in groups of multiple charging pulses with an additional rest period provided between each group of pulses. The charging pulses can be positive pulses, negative pulses, or a combination of both, with the pulse width of each pulse and the rest period between consecutive pulses varying, in some embodiments, according to predetermined criteria for maintaining temperature and gas production of the respective battery within specified limits during charging.

In embodiments of the invention utilizing current charging pulses during the charging sequence, the amplitude of each current pulse can be from approximately 0.003 C (charge rate) to approximately 20 C, while in embodiments utilizing voltage charging pulses, each voltage pulse can be from approximately battery open circuit voltage to approximately three times the battery open circuit voltage. Charging pulse width also can vary in some embodiments with the width of each pulse falling between approximately 10 milliseconds to approximately 1 second. Additionally, no specific shape is required for a charging pulse. Rest periods between pulses also can vary in some embodiments with each rest period being approximately 1 millisecond to 10 minutes in duration based upon the particular application, i.e. SOC determination, charging, etc.

In accordance with another aspect of the present invention, a preferred method for charging a battery comprises the steps of: generating a first discharge pulse; applying the first discharge pulse to a battery; determining, based upon battery response to said the discharge pulse, the state of charge and/or the battery charge acceptance of the battery; generating a first charging pulse group based upon the state of charge and/or the battery charge acceptance of the battery; and applying the first charging pulse group to the battery.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Reference will now be made in detail to the description of the present invention as illustrated in the drawings with like numerals indicating like parts throughout the several views. As illustrated and described herein, the battery state of charge (SOC) detector 10 (FIG. 1) of the present invention provides an efficient device and method for charging (both rapid and slow charge), formatting, and reconditioning batteries. The invention also provides a device and method for determining battery SOC both before and during a battery charging sequence and which charges a battery in response to the determined SOC, thereby efficiently charging the battery while avoiding overcharge and undercharge of the battery and while, in some embodiments, providing the operator with a real-time indication of the battery's SOC.

The SOC process may be accomplished by either a pulse method (which includes more than a single pulse) or an alternating current (a-c) pulse method. Each of these being described in detail hereinbelow.

As shown in FIGS. 2–7, a battery's SOC can be effectively estimated based upon the relationship of the SOC of a battery 12 (FIG. 1) and the equivalent circuit parameters plus phase angle response to selected a-c input frequencies. In a preferred embodiment, this is accomplished by the SOC detector 10 selectively applying a-c current at a frequency of approximately 0.001 Hz to approximately 250 Hz to the terminals of the battery 12, e.g. negative terminal 14 and positive terminal 16, and then measuring the impedance response of the battery after an appropriate time delay. This time delay is established in a known conventional manner to ensure that transients, such as harmonic transients, among others, have decayed sufficiently, thereby resulting in an accurate measurement of the battery's impedance response.

Once the equivalent circuit parameters of the battery 12 have been determined, an estimated SOC is calculated by referencing the equivalent circuit parameter values vs. SOC diagrams (i.e. FIGS. 2–7) which have been previously constructed for the type and rating of the battery being tested and which are stored as data in the detector 10, i.e. in system hardware or software.

Laboratory experiments have shown that battery SOC is sensitive to the frequency ($\omega$) of input energy as displayed in plots of: impedance (z), i.e. Nyquist and Bode plots; phase angle ($\phi$); equivalent circuit series and parallel capacitance ($C_S$, $C_P$), and; equivalent circuit series and parallel resistance ($R_S$, $R_P$). Since the real interest is in the capacity of the battery, the imaginary component can be used as a representation of the status of the active material contained inside the battery. This is because a significant portion of the real component is ohmic resistance.

It has been shown that battery impedance can be represented as either a parallel circuit ($R_P C_P$) or as a series circuit ($R_S C_S$), where $R_P$ and $R_S$ are the equivalent circuit resistance, and $C_P$ and $C_S$ are the equivalent circuit capacitance, respectively. The impedance (z) of a battery is represented by:

$$z = R_S - \frac{j}{\omega C_S} = \frac{(R_S \omega C_S - j)}{\omega C_S}, \text{ and}$$

$$\frac{1}{z} = \frac{\omega C_S (R_S C_S + j)}{(R_S \omega C_S - j)(R_S \omega C_S + j)} = \frac{R_S \omega^2 C_S^2}{1 + (R_S \omega C_S)^2} + \frac{j \omega C_S}{1 + (R_S \omega C_S)^2}$$

The impedance of the parallel circuit ($R_P C_P$) is represented by:

$$\frac{1}{z} = \frac{1}{R_P} - \frac{\omega C_P}{j}$$

Finally, the relationship between the series and parallel resistance and capacitance is represented by:

$$R_P = \frac{1 + (R_S \omega C_S)^2}{R_S \omega^2 C_S^2}, \text{ and}$$

$$C_P = \frac{C_S}{1 + (R_S \omega C_S)^2}$$

Laboratory experiments have also shown that phase angle ($\phi$) and $C_S$ are extremely sensitive to low frequency input. In particular, over certain intervals of SOC, the equivalent circuit parameters increase or decrease with the SOC. For example, with Ni—Cd batteries, phase angle ($\phi$) decreases with an increase of SOC at 25 Hz, and therefore, allows SOC to be determined. Additionally, impedance at low frequency is sensitive to low SOC's (i.e. as low as approximately 20%). With response data collected for batteries of various types at various frequencies ranging from approximately 0.001 Hz to approximately 250 Hz, a map of equivalent circuit parameters referenced to SOC can be constricted. Separate criteria can then be established so that individual parameters (i.e. $\phi$, $R_P$, $C_P$, $R_S$, and $C_S$) can be referenced to specific frequencies, and thereby establish a look-up table from which batteries can be verified based upon their equivalent circuit parameters and battery chemistry.

Battery condition information, such as temperature, internal pressure, etc, also can be measured in some embodiments (i.e. FIG. 1), such as by temperature sensor 18 (i.e. a thermocouple) and pressure sensor 20 (i.e. a pressure transducer), respectively, with the information being provided to the detector 10 for use in a working SOC determination.

Figure 1:
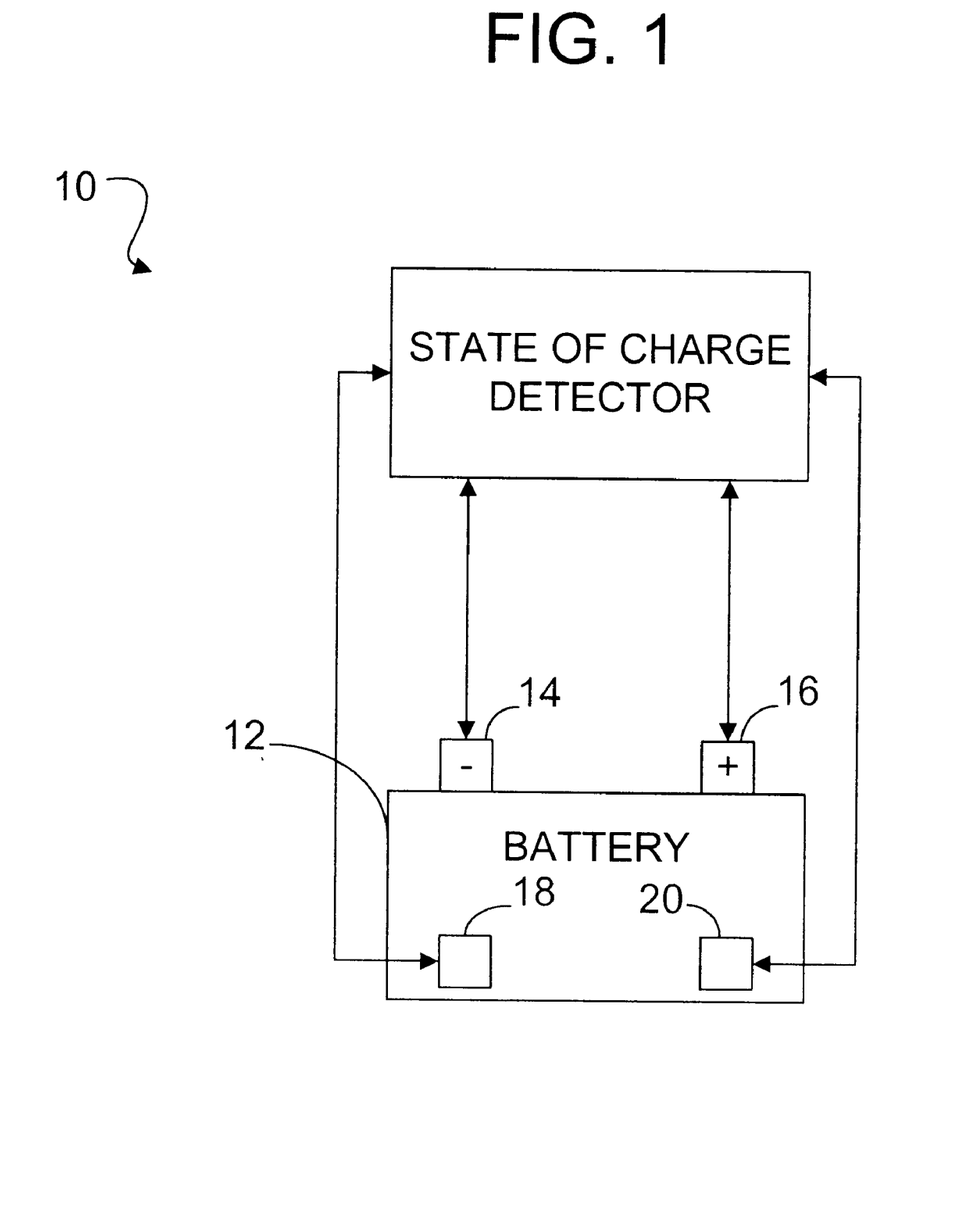
FIG. 1 is a high-level schematic diagram of a preferred embodiment of the SOC detector of the present invention.
Figure 2:
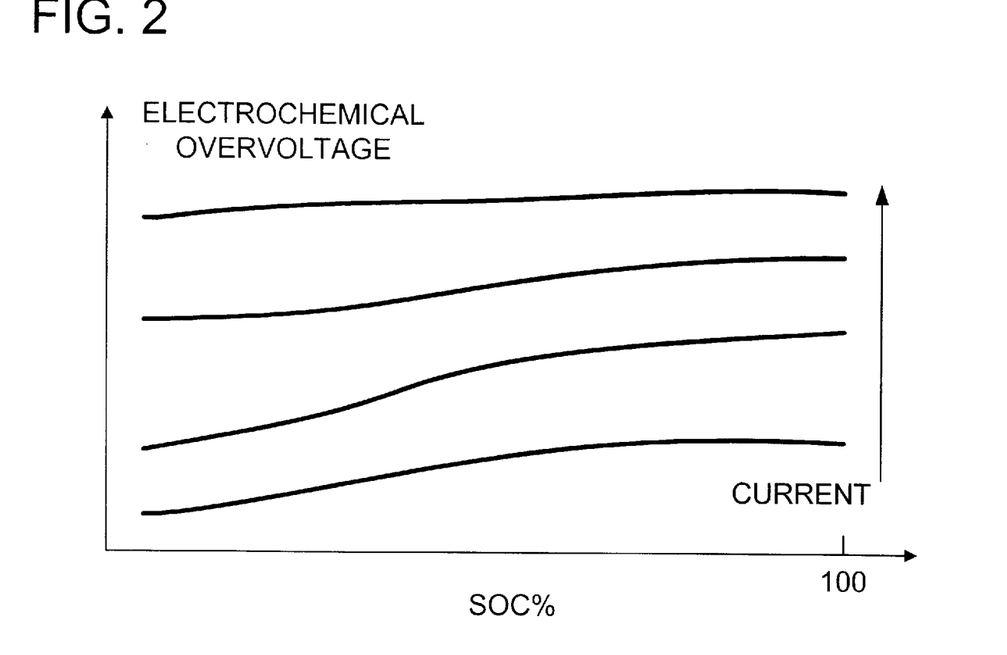
FIG. 2 is a diagram of representative of Electro-Chemical Overvoltage versus SOC.
Figure 3:
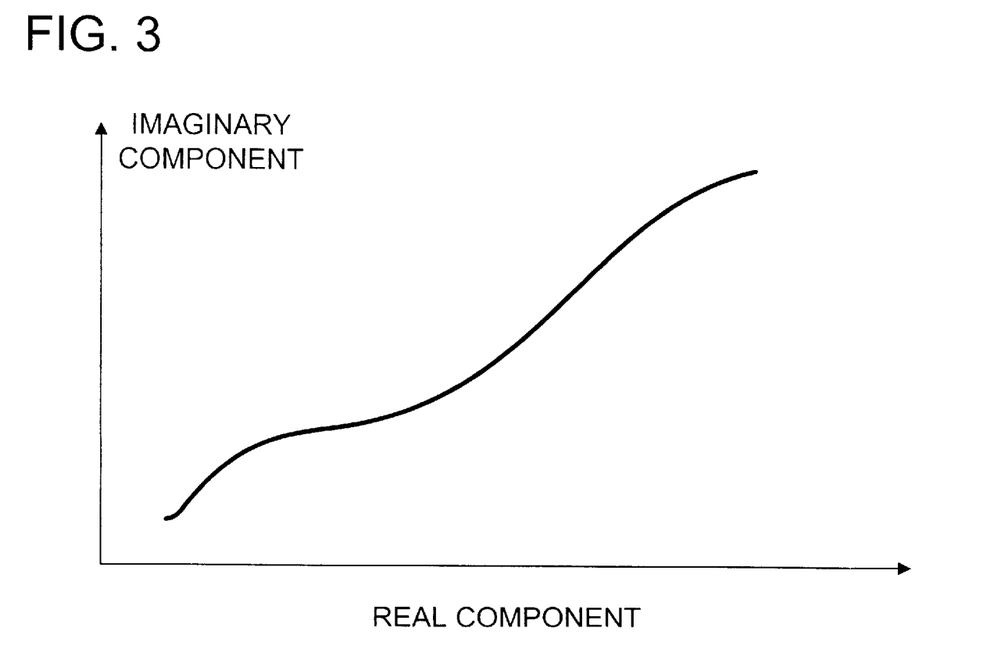
FIG. 3 is a diagram of real and imaginary component (Nyquist, Bode Plot) responses from a battery in response to a-c current at multiple selected frequencies.
Figure 4:
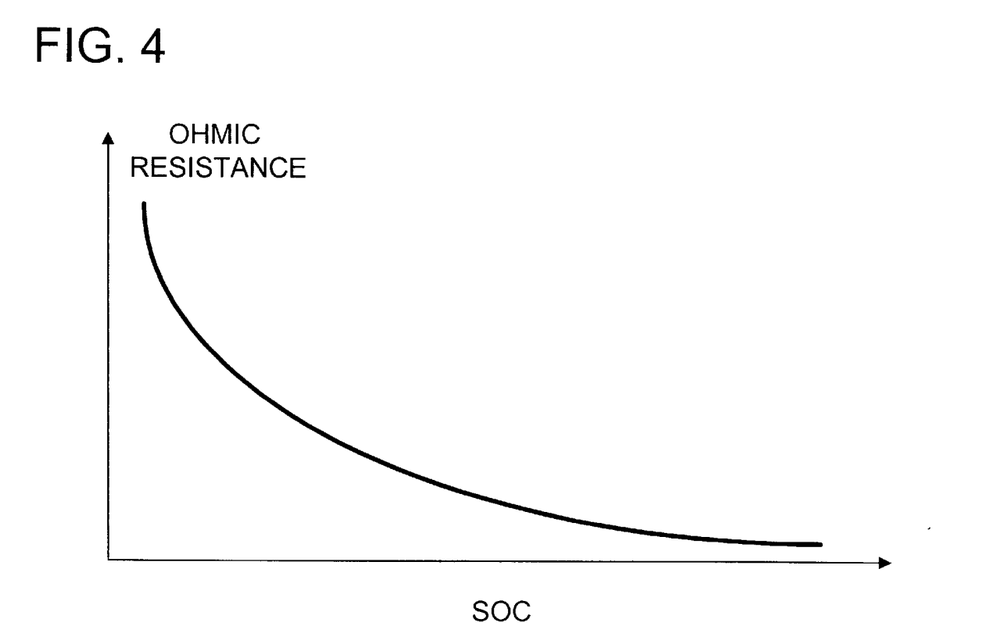
FIG. 4 is a diagram showing Internal (Ohmic) Resistance versus SOC for a typical lead-acid battery.
Figure 5:
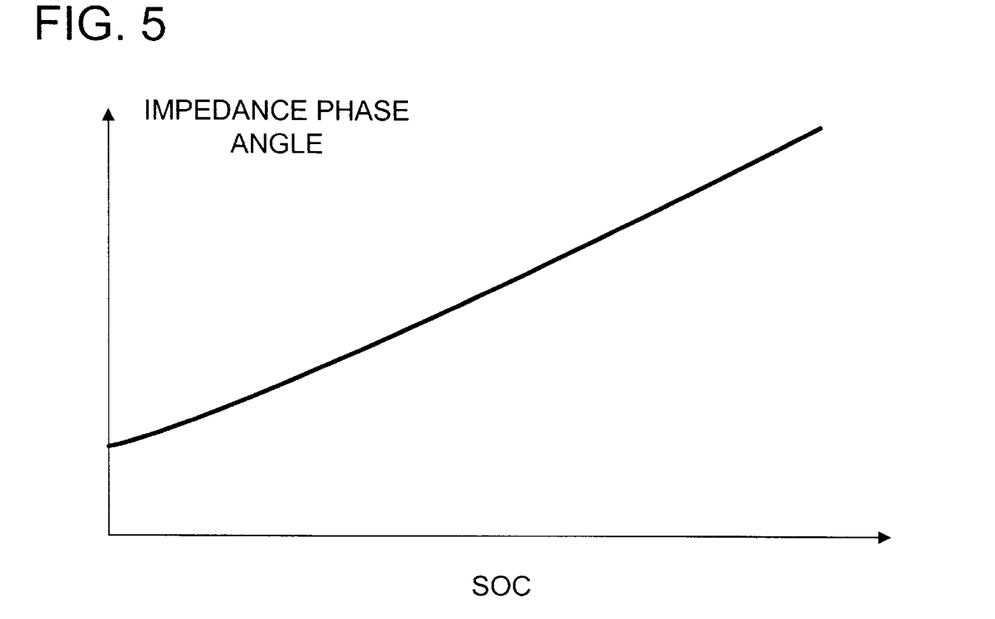
FIG. 5 is a diagram showing Impedance Phase Angle versus SOC for a typical lead-acid battery.
Figure 6:
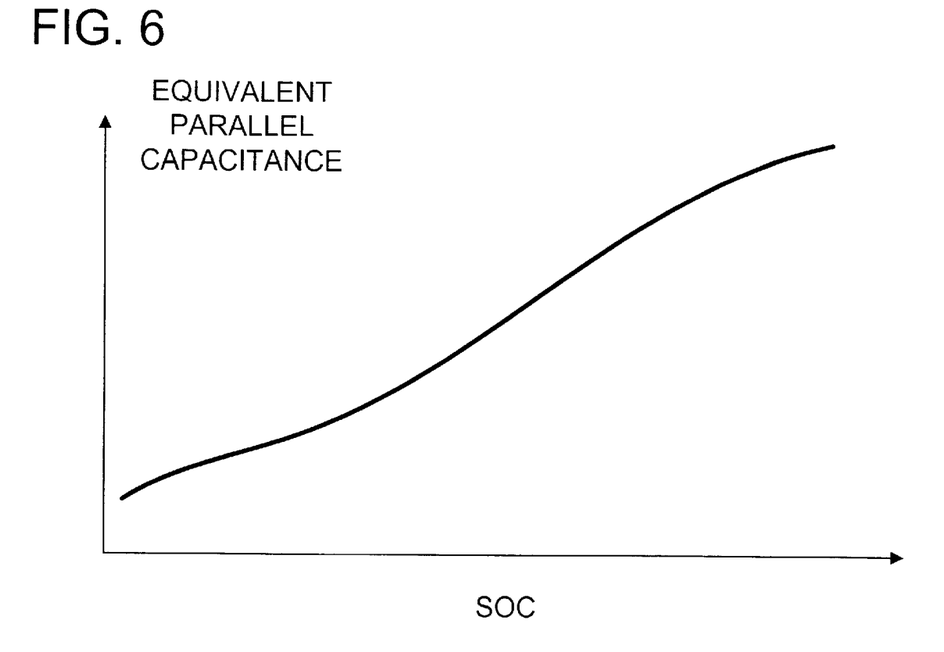
FIG. 6 is a diagram showing Equivalent Parallel Capacitance versus SOC for a typical lead-acid battery (similar diagrams can be constructed for different battery types)
Figure 7:
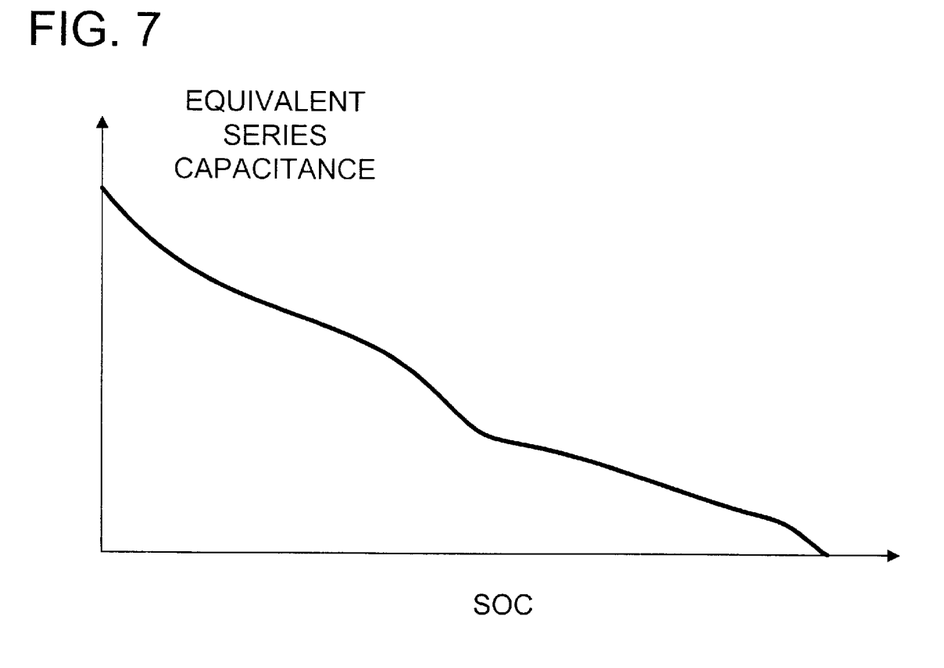
FIG. 7 is a diagram of Equivalent Series Capacitance versus SOC for a typical lead-acid battery.

As shown in FIGS. 1 and 2, a battery's SOC can also be effectively estimated based upon the relationship of the SOC of a battery 12 and the electrochemical overvoltage (RFV) of the battery. In a preferred embodiment, this is accomplished by the SOC detector 10 selectively applying a current pulse(s) to the terminals of the battery (FIG. 1), e.g. negative terminal 14 and positive terminal 16, and then measuring the voltage response of the battery after an appropriate time delay. This time delay is established in a known conventional manner, ensuring, that the electric transient of the battery does not influence the voltage measurement, thereby resulting in an accurate measurement of the battery's RFV. Once the RFV of the battery 12 has been determined, an estimated SOC is calculated by referencing the voltage curves of an RFV vs. SOC diagram (i.e. FIG. 2) which has been previously constructed for the type and rating of the battery being tested and which is stored as data in the detector 10, i.e. in system hardware or software.

Preferred embodiments of the SOC detector 10 also can estimate battery SOC based upon the relationship between a battery's internal resistance and SOC. Once the battery's internal resistance has been determined in a conventional manner, an estimated SOC is calculated by referencing an electrochemical overvoltage vs. SOC diagram (i.e. FIG. 2) which also has been constructed for the type and rating of the battery being tested and which is stored as data in the detector 10, i.e. in system hardware or in software stored on a computer readable medium. Battery condition information, such as temperature, internal pressure, etc, also can be measured in some embodiments (i.e. FIG. 1), such as by temperature sensor 18 (i.e. a thermocouple) and pressure sensor 20 (i.e. a pressure transducer), respectively, with the information being provided to the detector 10 for use in a working SOC determination.

Figure 8:
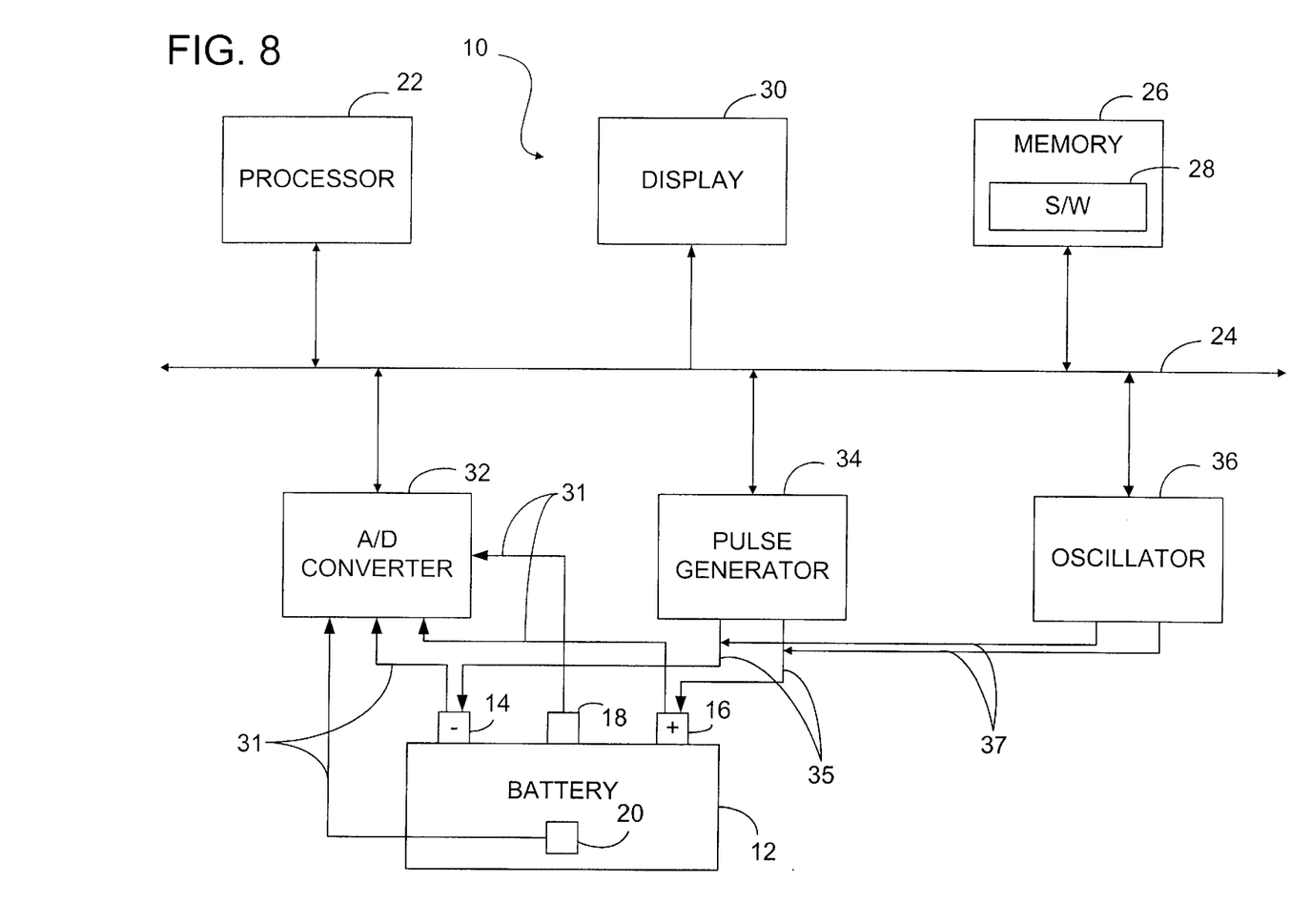
FIG. 8 is a high-level schematic diagram of a preferred embodiment of the SOC detector of the present invention.

As shown in FIG. 8, a preferred embodiment of the SOC detector 10 incorporates a processor 22, such as a microprocessor, which communicates with a data bus 24 and which is configured to process data transmitted along the bus. Bus 24 communicates with memory 26 which can be external to processor 22 and which can be configured to facilitate the use of computer software 28 which is configured with SOC detection and charging algorithms (discussed hereinbelow). A display 30, such as a conventional computer monitor or gauge, also can be incorporated and configured to display SOC information transmitted from the processor 22 along bus 24.

Battery information in the form of analog signals is transmitted via conventional leads 31 from the battery 12 to one or more analog-to-digital (A/D) converters 32. Converter 32, such as a Data Acquisition (DAQ) device manufactured by National Instruments, among others, converts the analog signals corresponding to, for example, terminal voltage, current, battery temperature and internal pressure to digital signals and provides the digital signals to the bus 24. Additionally, a pulse generator 34 communicates with the bus 24 which is responsive to commands from the processor 22 and which is configured for providing both SOC determination and charging pulses to the terminals 14 and 16 of the battery 12 via leads 35. Oscillator 36, which can be internal to the pulse generator 34, communicates with the bus 24 and cooperates with the pulse generator, such as through leads 37, to provide oscillating a-c signals from the pulse generator. The a-c signals can be generated at relatively low power by a simple inverter circuit imbedded in the pulse generator, for example.

Once all relevant battery information is received by the processor 22, the processor computes a working SOC. This computation can include, among others: (1) selecting a single SOC or averaging multiple estimated SOC's generated from the stored equivalent circuit parameter data vs. SOC data; (2) selecting a single SOC or averaging multiple estimated SOC's generated from the stored equivalent circuit parameter data vs. SOC data; and (3) selecting a single SOC or averaging multiple estimated SOC's generated from all sources of stored data. Additionally, computation of a working SOC can include cross-references to other data including, among others: (1) peak voltage measured across the battery terminals while applying a current pulse; (2) voltage time derivative while applying a current pulse; (3) peak voltage difference between pulses when applying current pulses; (4) voltage measured across battery terminals during a rest period; (5) voltage time derivative during a rest period; (6) peak current from the battery while applying a voltage pulse; (7) current time derivative while applying a voltage pulse; (8) peak current difference between pulses when applying voltage pulses; (9) peak current from the battery during a rest period; and (10) current time derivative during a rest period.

Figure 9:
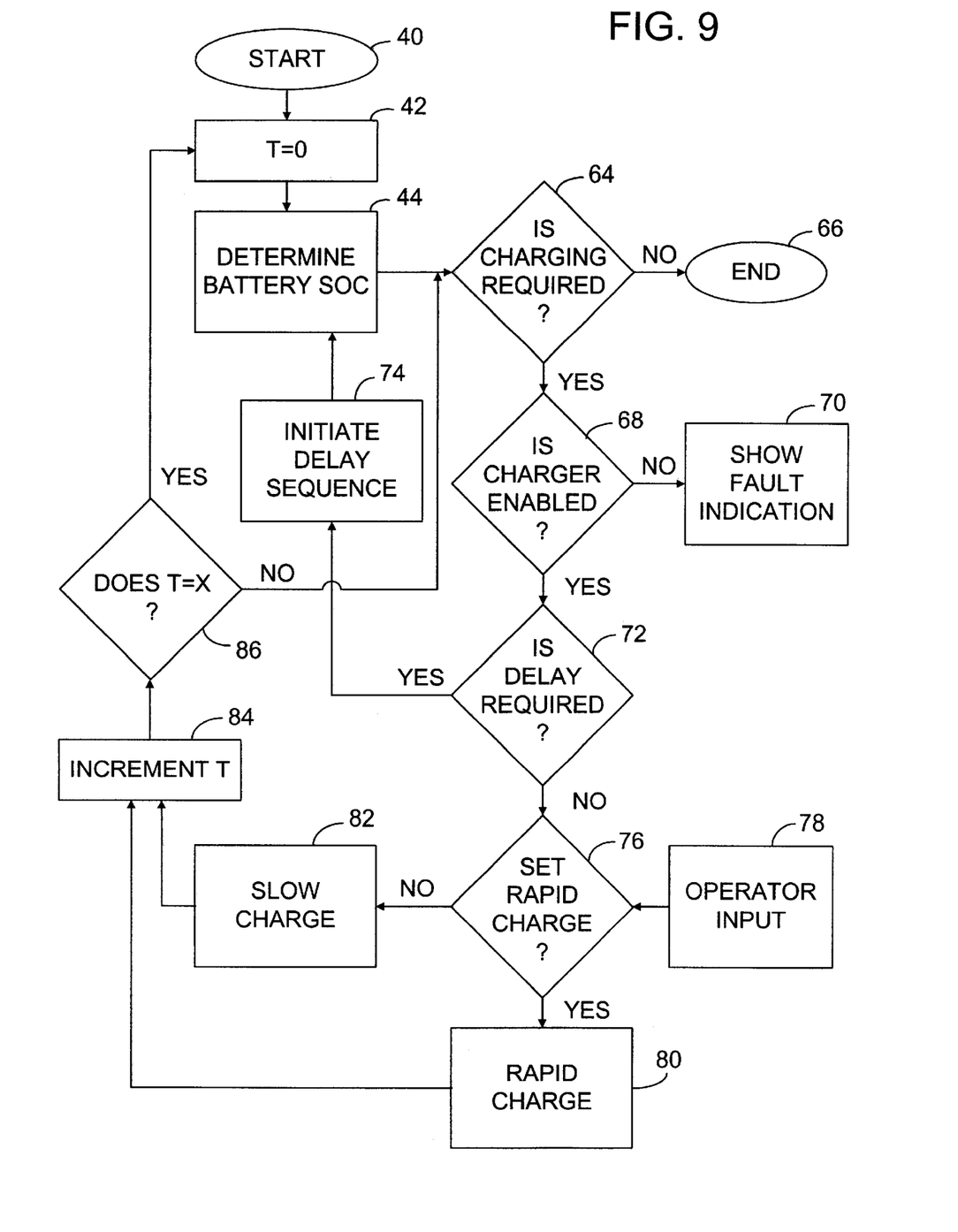
FIG. 9 is a flow chart showing the charging sequence of a preferred embodiment of the present invention.

With reference to FIGS. 9–14, the method of operation of a preferred embodiment of the SOC detector 10 will be discussed. As shown in FIG. 9, operation of the SOC detector 10 is initiated at block 40 after the detector is connected to a power source, a battery is connected to the detector, and after an operator selects "CHARGE," for instance, on a charging panel (not shown). It should be noted that while specific battery connector configurations are beyond the scope of this invention, it is anticipated, however, that a universal connector assembly incorporating leads 31 for battery terminals 14 and 16 and for battery condition data transmission, i.e. temperature information, as well as leads 35 for a-c pulse application can be incorporated into the detector without undue experimentation by one of ordinary skill in the art. After the detector is initiated, a timing variable "T" is set to zero at block 42 and a determination of battery SOC is commenced at block 44.

Figure 10:
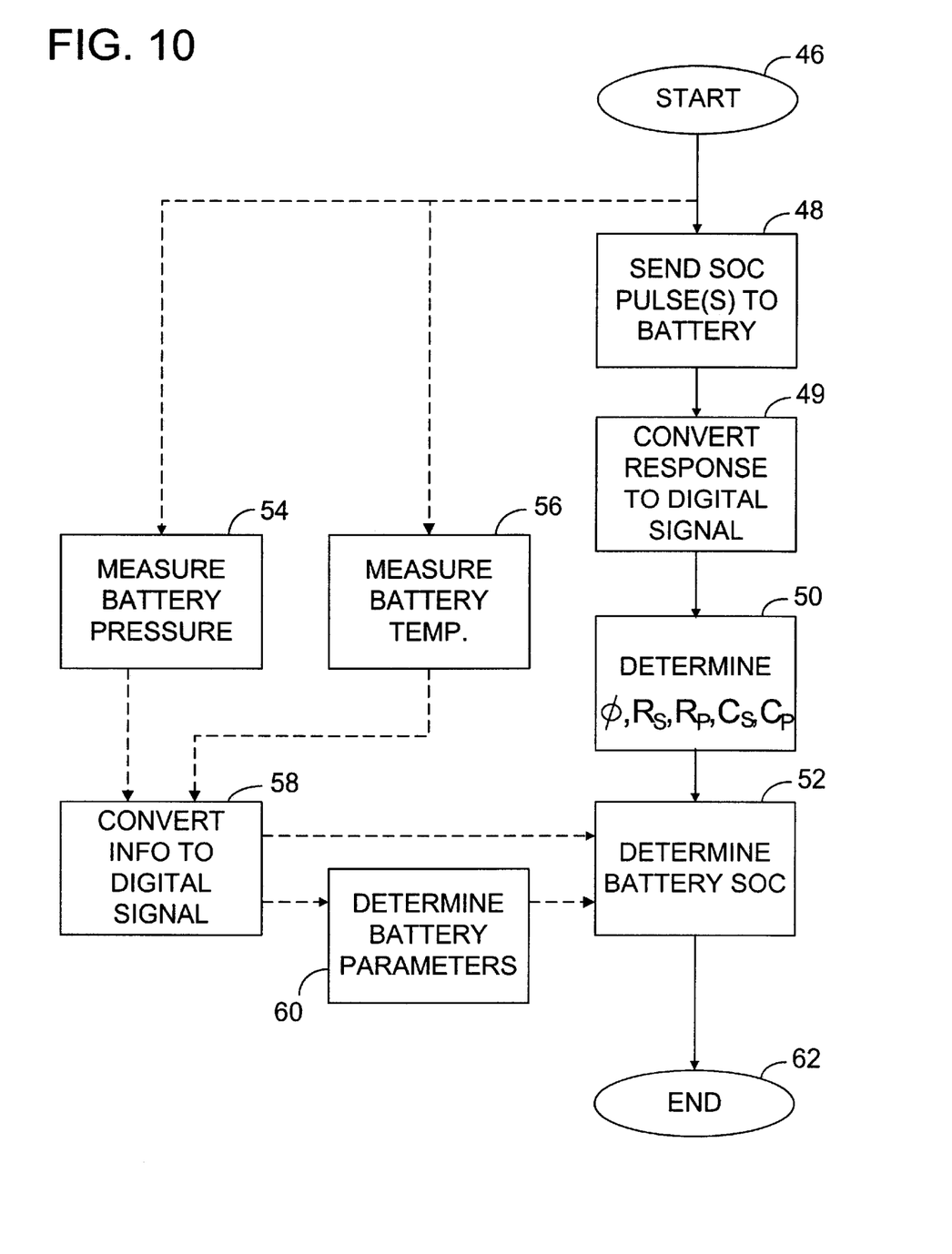
FIG. 10 is a flow chart showing detail of block 44 of the embodiment of the present invention shown in FIG. 9.
Figure 11A:
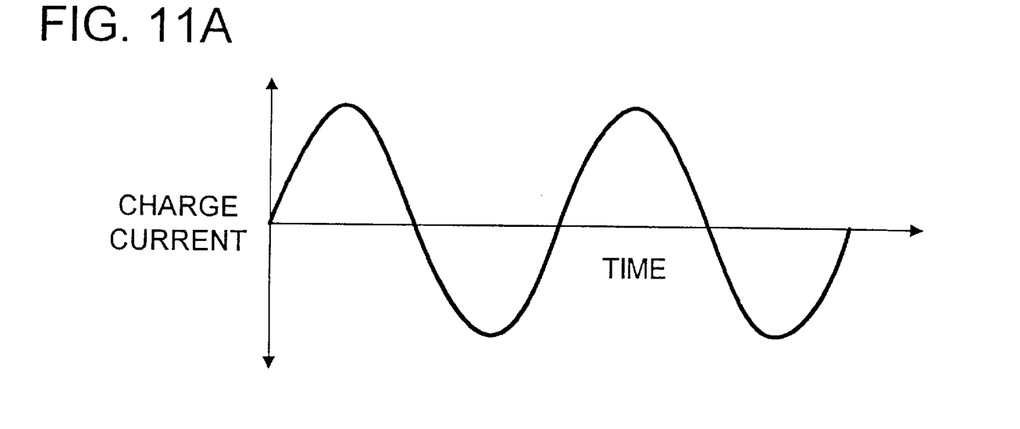
FIGS. 11A–11E are diagrams showing representative SOC determination pulses.
Figure 11B:
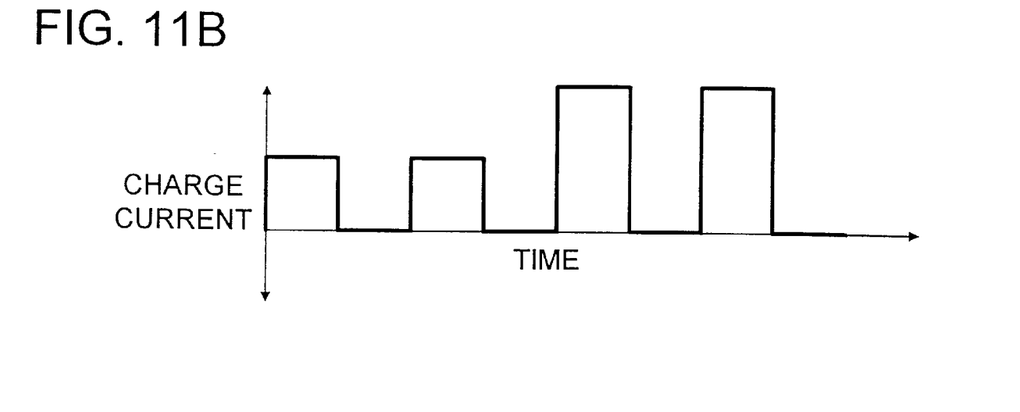
Figure 11C:
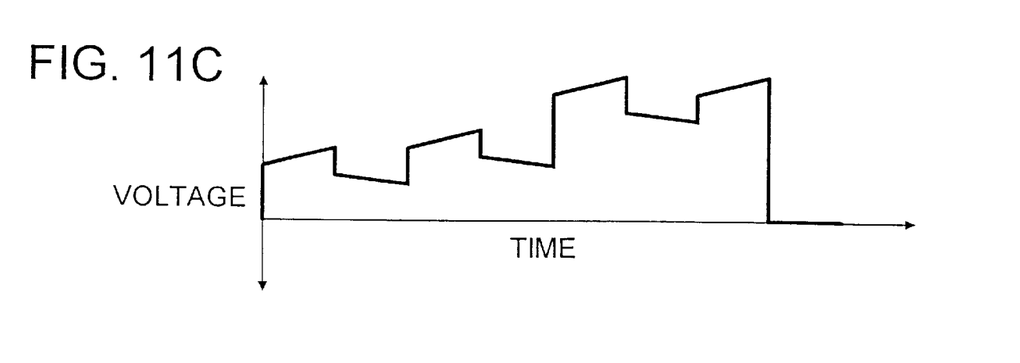
Figure 11D:
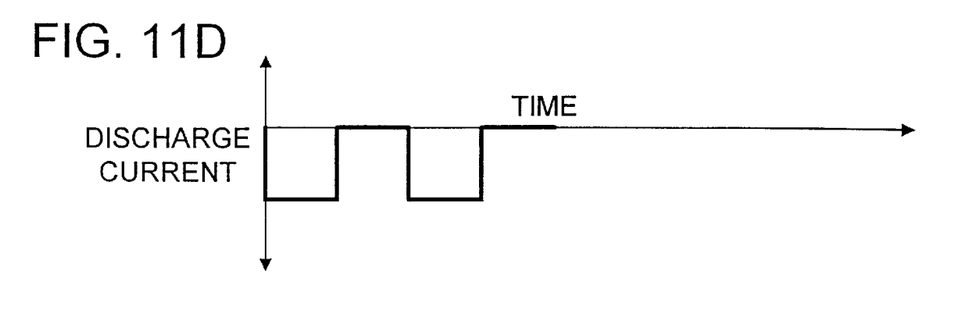
Figure 11E:
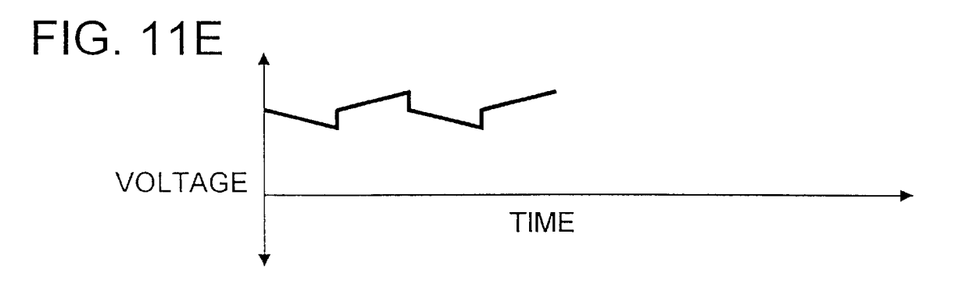

As shown in detail in FIG. 10, the battery SOC determination algorithm starts at block 46. At block 48, the processor 22 (FIG.8) directs the pulse generator 34 to provide an SOC determination a-c pulse to the battery 12. In a preferred embodiment, the pulse is a current pulse, however, voltage pulses also can be utilized (examples of representative SOC determination a-c pulse wave, and single pulse wave forms are shown in FIGS. 11A–11E). After the SOC determination pulse(s) are sent to the battery, battery response is converted to digital signals by the A/D converter 32 at block 49. The digital signals corresponding to the battery response is then processed at block 50 to determine values, such as $\phi$, $R_P$, $C_P$, $R_S$, and $C_S$, after an appropriate time delay as discussed hereinabove. A working SOC is then determined at block 52 with reference to either the battery's impedance response, or overvoltage response, and by comparing the response to equivalent circuit parameter data vs. SOC data (when utilizing battery impedance response) or overvoltage parameters vs. SOC data (when utilizing overvoltage response ) which has been previously stored in memory 26.

In some embodiments, battery internal pressure can be measured at block 54 with analog signals from the pressure sensor 20 being converted to digital signals in block 58. Likewise, battery temperature can be measured at block 56 with the analog signals from the temperature sensor 18 being converted to digital signals at block 56. The digital temperature and/or pressure signals are then either directly utilized as cross-reference information in block 52 for determining a working SOC, or utilized at block 60 for determining additional parameters, such as the battery's internal resistance, etc. Additionally, the temperature and pressure information can be stored for later reference, such as for determining whether a delay in the charging sequence should be initiated (i.e. battery temperature and/or pressure have increased beyond predetermined limits, as discussed hereinbelow). Once internal resistance has been calculated, this information also can be utilized as cross-reference information for determining a working SOC. In block 52, a working SOC is calculated as discussed hereinabove. The SOC determination algorithm ends at block 62.

After a working SOC is calculated at block 44 (FIG. 9), the detector 10 determines whether charging is required at block 64. If the working SOC is 100%, charging is not required and the charging sequence ends at block 66. SOC of 100% can be sensed by several additional methods, including: (1) Coulomb Calculation, e.g. when the coulombs charged is approximately 105–112% of previously discharged battery capacity; (2) Area Calculation (not valid for lithium batteries), e.g. if the area (voltage multiplied by time) for the previous charging period is equal to or greater than the area of the current charging period; and (3) Off-Period Area Calculation, e.g. if the area of an off period is equal to or bigger than the area of the next off period. If the working SOC is less than 100%, detector circuitry is self-diagnosed at block 68 (i.e. power source connected, battery connected, etc) and a determination is made as to whether the detector is able to initiate a charging sequence. If the detector fails the diagnostic, a fault indication is presented to the operator in block 70, such as on display 30 (FIG. 7), an annunciator light, etc, otherwise, the sequence proceeds to block 72.

At block 72, the detector determines whether a delay is required before initiating or continuing a charging sequence. This determination can be based on several parameters including battery temperature, internal pressure, and time of day (in order to delay charging until off-peak energy use hours for promoting reduced charging costs), among others. The measured parameters are compared to stored data which can be based on manufacturer specifications, operator input, etc. If a delay is required, a delay sequence is initiated at block 74 with the duration of the delay corresponding to the degree of correlation between the measured battery parameters and optimum values for those parameters (e.g. a temperature slightly higher than optimum temperature receives a shorter delay than a higher temperature). After the delay sequence, the process returns to block 44 where a subsequent determination of working SOC is made as discussed hereinabove.

If a delay is not required, the detector 10 determines whether to set the charging sequence for rapid charge or slow charge (block 76). This determination is based on several parameters, including operator input (block 78) and the value of the working SOC. If rapid charging is required, the detector initiates the rapid charge sequence at block 80, otherwise, the slow charge sequence is initiated at block 82. After a predetermined number of charging signals have been sent to the battery being charged (rapid charge), the timing variable "T" is incremented at block 84. If "T" does not equal a predetermined value "X" (block 86), the process returns to block 64 where the sequence is run again. If "T" equals "X," the process returns to block 42 where "T" is reset to zero and the entire sequence is repeated.

Figure 12A:
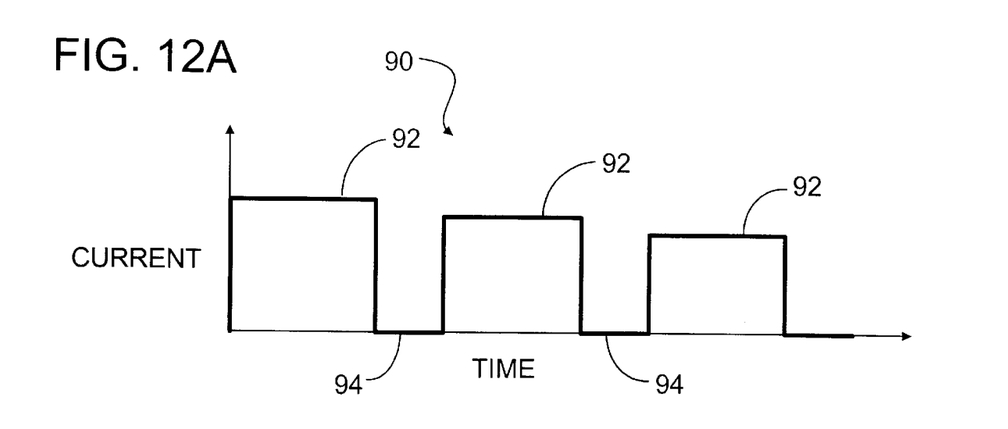
FIGS. 12A–12C are diagrams showing representative charging pulse groups.
Figure 12B:
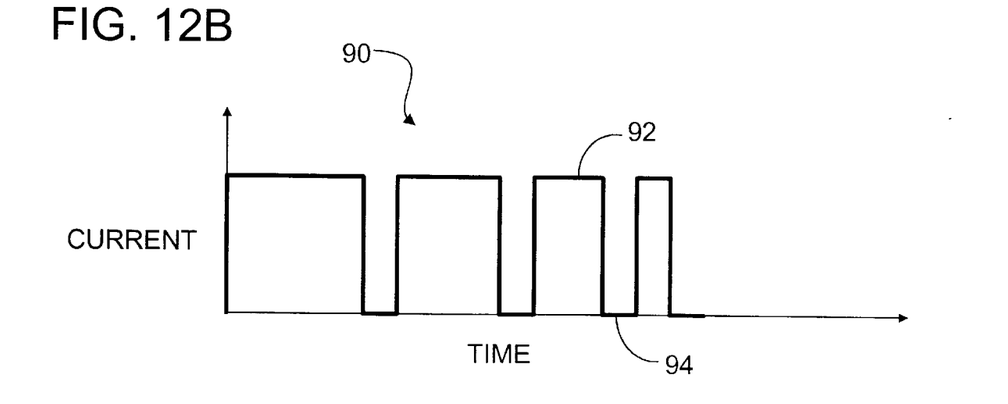
Figure 12C:
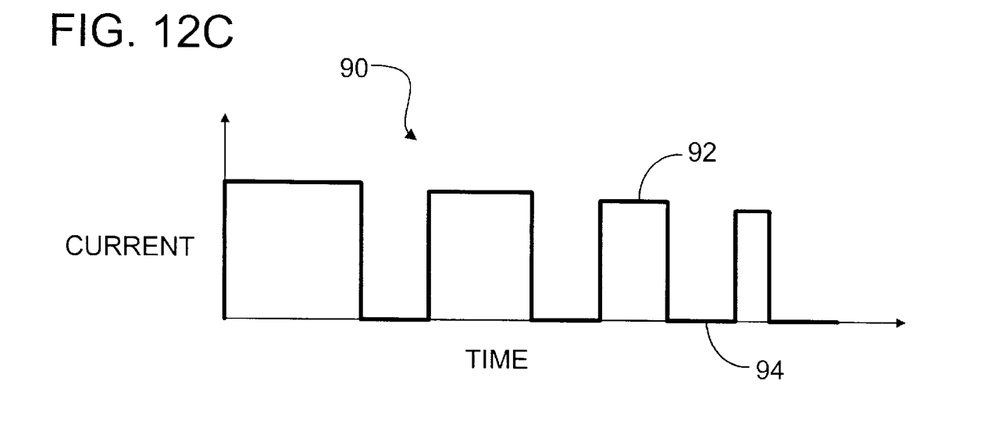

As shown in FIGS. 12A–12C, the charging signal consists of one or more groups 90 of pulses, with each group 90, as well as each pulse 92 within a pulse group, being separated by a rest period 94. The successive pulse groups 90 delivered to a battery during a charging sequence can have the same average current value, or alternatively, the groups can have different average current values depending upon the battery SOC. Additionally, the amplitude and width of each pulse and the duration of the rest period between each pulse group can vary, with all variances established to optimize the efficiency of the charging sequence. Utilization of pulse groups also allows the battery to charge during the rest periods through the discharge of capacitor effect within battery, thereby further improving charging efficiency. The transition from one pulse group format to another pulse group format is determined in reference to the battery's working SOC, as described hereinbelow.

After battery SOC reaches approximately 45%–85%, selected pulse groups 90 (FIGS. 13A–13C) can incorporate depolarization (negative) pulses 96 employed in the rapid charging process until battery SOC reaches 100%. This serves to increase battery charging acceptance by reducing polarization through increasing reactant ion concentration and reducing resultant concentration near the battery electrode/electrolyte interface. For slow charging, depolarization pulses are not required; however, pulse groups with depolarization pulses can still be utilized for slow charge if desired. When depolarization pulses 96 are utilized, each pulse 96 follows a rest period 94. The amplitude of each depolarization pulse 96 within a pulse group 90 should be the same or less than that of the charging pulse 92 immediately preceding the depolarization pulse. The pulse width of each depolarization pulse 96 should be less than approximately 5% of the pulse width of the charging pulse 92 which immediately precedes that depolarization pulse. Typically, the pulse width of a depolarization pulse 96 should be between approximately 1 ms to approximately 100 ms.

Figure 13A:
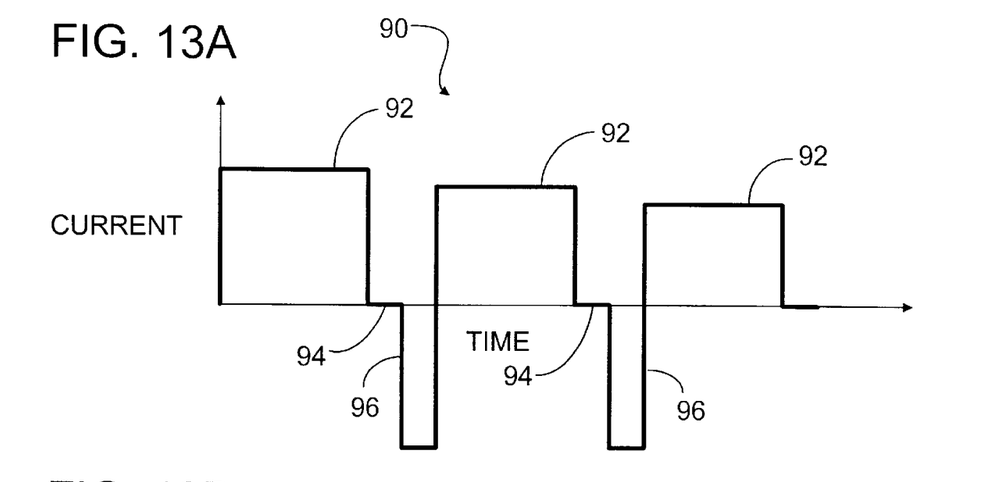
FIGS. 13A–13C are diagrams showing representative charging pulse groups incorporating depolarization charges.
Figure 13B:
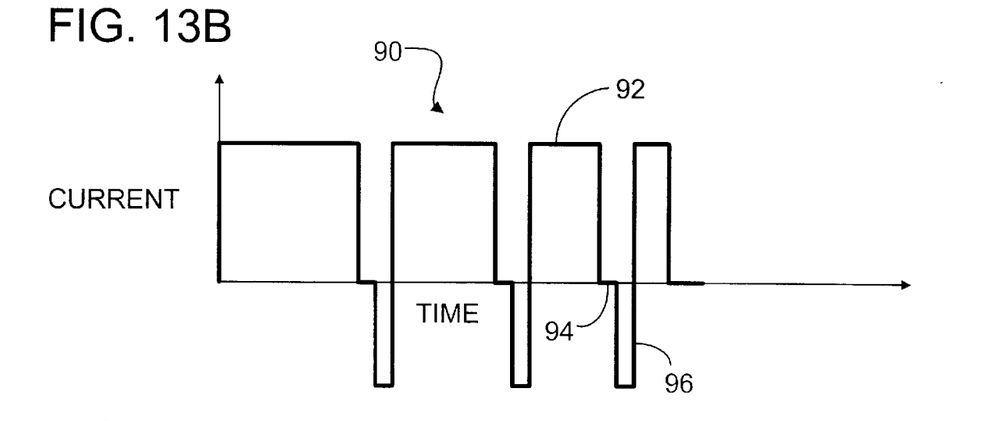
Figure 13C:
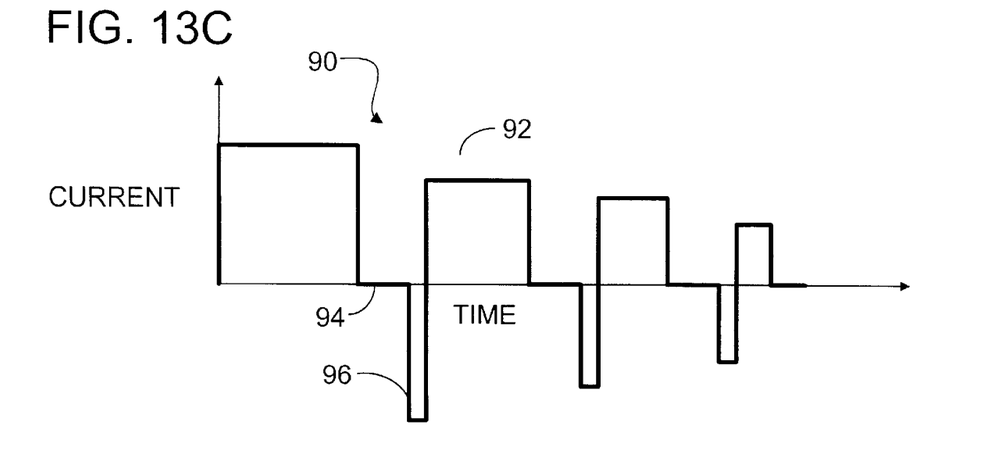

Transitioning between different pulse groups 90 occurs whenever specific battery conditions are satisfied. These conditions can include: SOC, battery temperature, peak voltage, voltage during the rest period, internal resistance, internal pressure, RFV, voltage during charging, voltage during depolarization pulses and rest periods, and voltage derivative with time, as described hereinabove. Transitioning between different pulse groups serves to reduce gassing (or electrolyte decomposition) through the reduction of overvoltage conditions which can occur during conventional charging processes. For example, when a battery has a low SOC, the charge acceptance of the battery is high, and the battery is capable of receiving a high energy charging pulse with a minimal risk of causing a battery overvoltage. However, as battery SOC increases, battery charge acceptance decreases, thereby increasing the risk of overvoltage during charging. Therefore, as SOC increases, charging pulse amplitude and pulse width should be reduced accordingly. The reduced charging pulse amplitude and pulse width serve to reduce gassing and heating which can produce serious problems whenever charging current remains unchanged as battery SOC increases. The reduced charging pulse amplitude and pulse width also serve to increase coulombic efficiency and energy efficiency. Furthermore, when SOC reaches a predetermined level, depolarization pulses can be employed to further increase battery charging acceptance by increasing reactant ion concentration and reducing resultant concentration near the electrode/ electrolyte interface. Depolarization pulses also serve to reduce the rest period between charging pulses, thereby further increasing charging efficiency. Amplitude of depolarization pulse should be equal to or less than the positive pulse.

Figure 14:
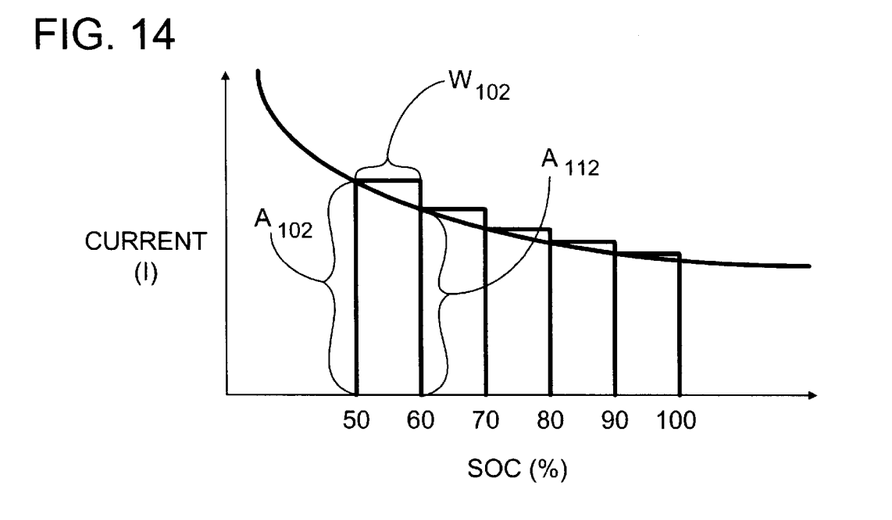
FIG. 14 is a diagram showing Current versus SOC for a typical battery with representative charge pulse amplitude calculations performed at 10% increments of SOC.
Figure 15:
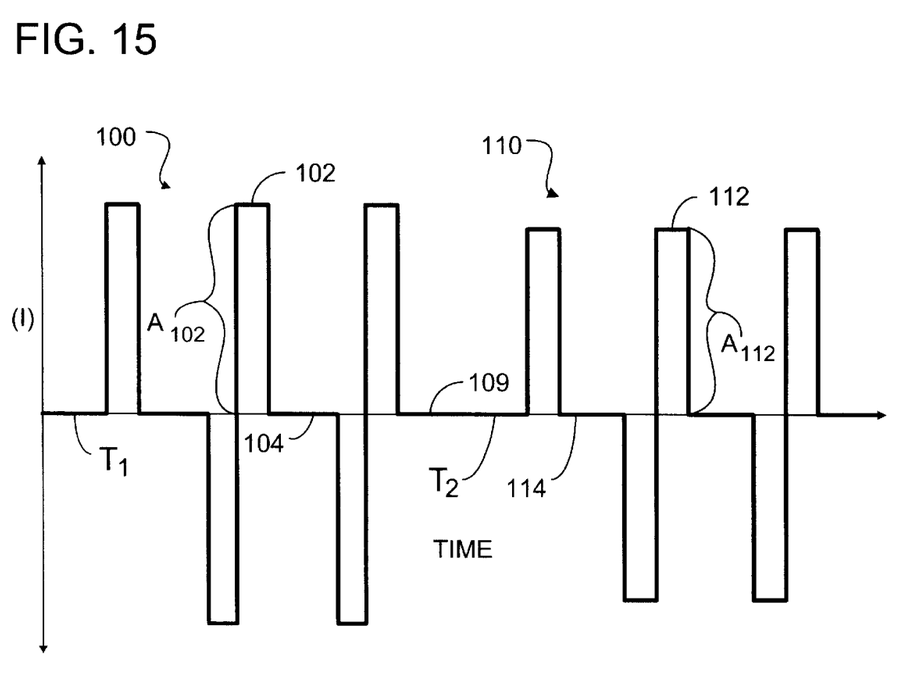
FIG. 15 is a diagram showing a representative series of grouped charging pulses for charging a battery in accordance with a preferred embodiment of the present invention.

As shown in FIG. 14, SOC is used to formulate the wave form for each charging pulse which is subsequently sent to a battery during a charging sequence. For example, when a battery SOC is determined to be 50% at time $T_1$ (FIG. 15), such as in block 44 of FIG. 9, and a rapid charge sequence is selected for battery charging, such as in block 80 of FIG. 9, a pulse group 100 is sent to the battery. The amplitude $A_{102}$ of each charging pulse 102 within pulse group 100 is calculated in reference to the value corresponding to 50% SOC on the diagram of FIG. 14. Typically, the amplitude of each charging pulse 102 as well as the average current for each group of pulses can be from approximately 0.003 C to approximately 20 C. Additionally, pulse width $W_{102}$ of each pulse 102 should be between approximately 10 ms to approximately 1 second. Rest periods 104 between each pulse 102 and rest periods 109 between pulse groups are between approximately 1 millisecond to approximately 10 minutes, with pulse width and rest period duration being determined based on battery conditions, such as temperature, pressure, etc.

At time $T_2$ (FIG. 15), SOC is recalculated and it is determined that the SOC of the battery has increased to 60%. A pulse group 110 is then sent to the battery with the amplitude $A_{112}$ of each charging pulse 112 within pulse group 110 calculated in reference to the value corresponding to 60% SOC on the diagram of FIG. 14. Likewise, rest periods 114 are between approximately 1 ms to approximately 10 minutes, with pulse width and rest period duration being determined based on battery conditions. This process is continued, until charging is completed.

As previously mentioned, the charging pulse also can be a voltage pulse; however, the amplitude of each voltage pulse should be between zero and three times that of the open circuit voltage. The pulse width and associated rest periods are the same as when current pulses are utilized; however, no depolarization pulses are utilized in the voltage pulse groups. Instead, a small positive pulse (not shown) is incorporated into the pulse group which corresponds to the depolarization pulse in a current pulse group. The amplitude of this small positive pulse is less than the battery open circuit voltage with the pulse width of this small pulse being the same as the corresponding current depolarization pulse described hereinabove. Additionally, both the pulse width and amplitude of this small positive pulse can change according to changes in battery SOC, as well as changes in other battery conditions.

The charging pulse also can be formed as a power pulse (not shown) which is similar to the above mentioned current and voltage pulses. However, the amplitude of each power pulse can be between battery maximum discharge power (short circuit discharge power) and minimum discharge power (discharge current is almost zero). The pulse width of each power pulse is the same as a current pulse or voltage pulse, and the rest period is the same as a current pulse. Depolarization pulses also can be utilized with the power pulses, however, each depolarization pulse amplitude should be the same or less than the corresponding power pulse which occurred prior to the depolarization pulse. The pulse width of a depolarization pulse utilized with the power pulses should be equivalent to that of the depolarization pulse of current pulse a charging group. Additionally, both the pulse width and amplitude of the power pulses can change according to change in battery SOC, as well as to other changes in battery condition.

Figure 16:
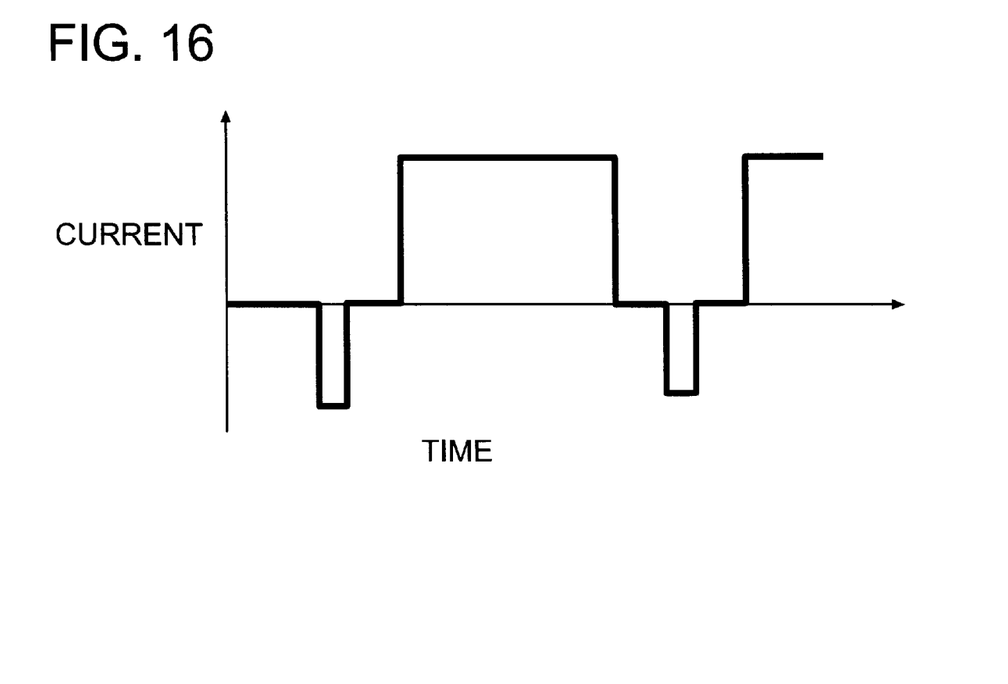
FIG. 16 is a diagram showing a representative series of grouped charging pulses for charging a battery in accordance with a preferred embodiment of the present invention.
Figure 17:
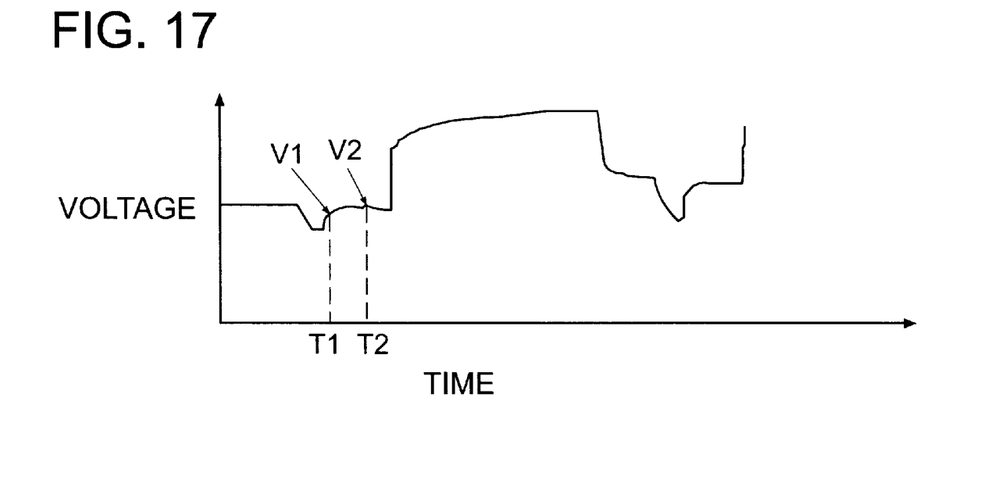
FIG. 17 is a diagram showing Voltage versus time during the charging cycle of the battery depicted in FIG. 16.

As depicted in FIG. 16, current pulses may be utilized to rapidly charge a battery, with discharge pulse(s) preferably being applied to the battery before each charging pulse group. Each discharge pulse is followed by a first rest period, and each charging pulse group is followed by a second rest period. During the first rest period, voltage across the battery may be measured at two different times, i.e., $t_1$ and $t_2$ (FIG. 17), with the measured difference in voltage (v2−v1) being compared to a preselected value in order to determine a charging current pulse amplitude and duration to be applied. So provided, gas generation and electrolyte decomposition within the battery may be reduced.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for charging a battery, comprising the steps of:
    generating a first discharge pulse;
    applying said first discharge pulse to a battery;
    determining, based upon battery response to said first discharge pulse, at least one of the group consisting of: state of charge of the battery and battery charge acceptance of the battery;
    generating a first charging pulse group based upon the state of charge of the battery or the battery charge acceptance of the battery; and
    applying said first charging pulse group to the battery.

2. The method of claim 1, further comprising the steps of:
    generating a second discharge pulse;
    applying said second discharge pulse to the battery;
    determining, based upon battery response to said second discharge pulse, at least one of the group consisting of: state of charge of the battery and battery charge acceptance of the battery;
    generating a second charging pulse group based upon the state of charge of the battery or the battery charge acceptance of the battery; and
    applying said second charging pulse group to the battery.

3. The method of claim 1, wherein the step of applying said first charging pulse group comprises sequentially applying additional ones of said first charging pulse group to the battery if the state of charge of the battery or the battery charge acceptance of the battery is less than a first predetermined level.

4. The method of claim 2, wherein the step of applying said second charging pulse group comprises applying said second charging pulse group to the battery if the state of charge of the battery or the battery charge acceptance of the battery is at least equal to said first predetermined level.

5. The method of claim 1, wherein the step of determining comprises measuring a first voltage of the battery and, after a delay, measuring a second voltage of the battery.

6. The method of claim 1, wherein said first predetermined level is between approximately 45% and approximately 85% of maximum state of charge of the battery.

7. The method of claim 1, wherein each pulse of said first charging pulse group has an amplitude of between approximately 0.003 C to approximately 20.0 C.

8. The method of claim 5, wherein the step of determining comprises comparing said first voltage and said second voltage.

9. A battery charger for charging a battery comprising:
    a pulse generator configured to generate a first discharge pulse and to apply said first discharge pulse to the battery;
    a detector configured to determine at least one of the group consisting of: state of charge of the battery and battery charge acceptance of the battery based upon battery response to said first discharge pulse;
    said pulse generator being further configured to generate a first charging pulse group corresponding to said at least one of said group such that battery charge is increased.

10. The battery charger of claim 9, wherein said pulse generator is configured to generate a second discharge pulse and to apply said second discharge pulse to the battery, said detector is configured to determine at least one of the group consisting of state of: charge of the battery and battery charge acceptance of the battery based upon battery response to said second discharge pulse, and wherein said pulse generator is further configured to generate a second charging pulse group corresponding to said at least one of said group such that battery charge is increased.

11. The battery charger of claim 9, wherein said pulse generator is configured to generate additional ones of said first charging pulse group and to sequentially apply said additional ones of said first charging pulse group to the battery if the state of charge of the battery or the battery charge acceptance of the battery is less than a first predetermined level.

12. The battery charger of claim 9, wherein said detector is configured to determine said at least one of the group by measuring a first voltage of the battery and, after a delay, measuring a second voltage of the battery.

13. A battery charger for charging a battery comprising:
    means for generating a first discharge pulse;
    means for applying said first discharge pulse to the battery;
    means for determining at least one of the group consisting of: state of charge of the battery and battery charge acceptance of the battery based upon battery response to said first discharge pulse;
    said means for generating being further configured to generate a first charging pulse group corresponding to said at least one of said group such that battery charge is increased.

14. The battery charger of claim 13, wherein said means for determining comprises means for measuring a first voltage of the battery and, after a delay, measuring a second voltage of the battery.

* * * * *